R. HUFF.
WIND SHIELD FOR MOTOR VEHICLES.
APPLICATION FILED JULY 30, 1910.

1,154,313.

Patented Sept. 21, 1915.
2 SHEETS—SHEET 1.

Witnesses
J. Adolph Bishop
J. H. Bruninga

Inventor
Russell Huff
by Foster Freeman Watson & Co't
Attorneys

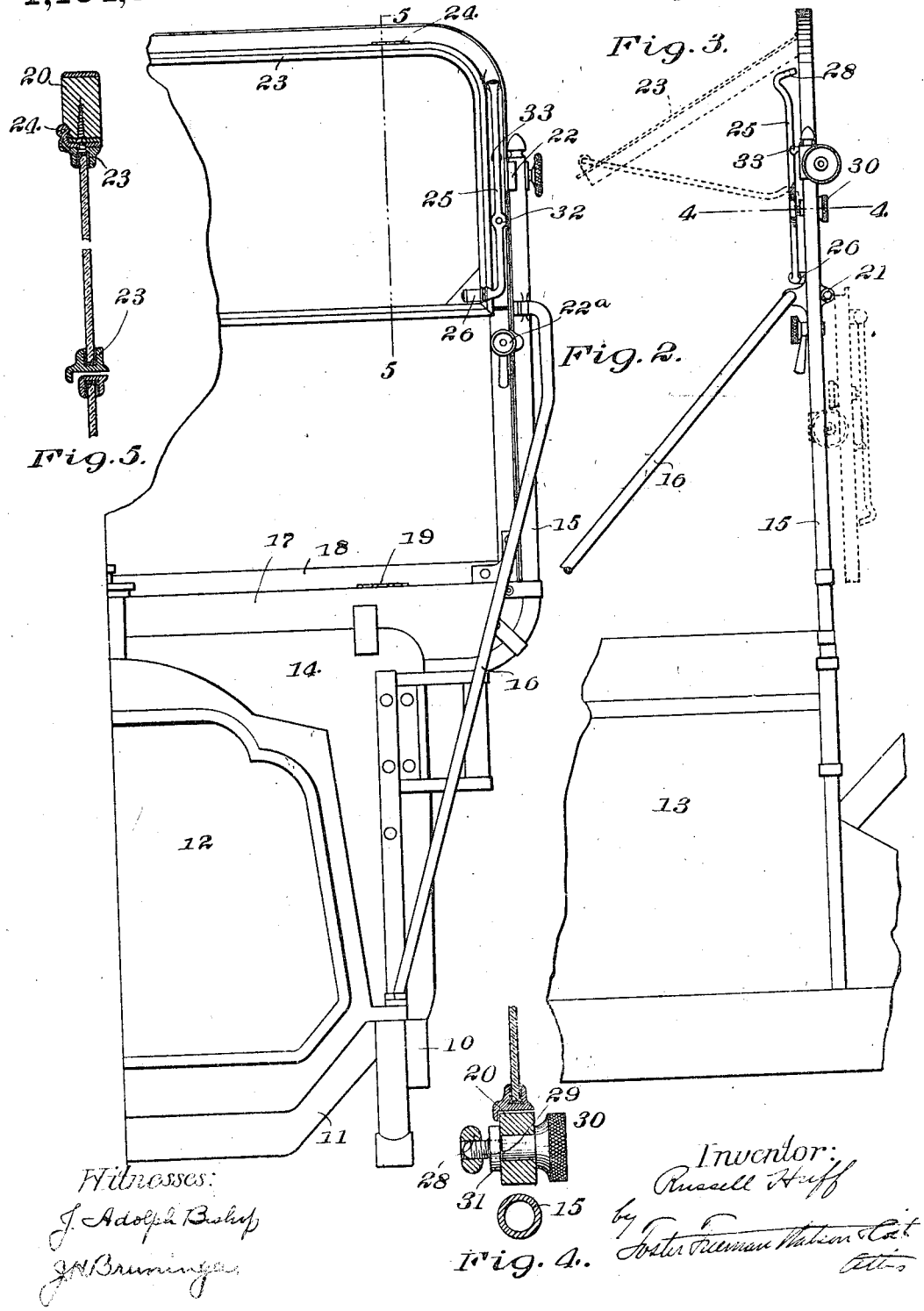

United States Patent Office.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

WIND-SHIELD FOR MOTOR-VEHICLES.

1,154,313.

Specification of Letters Patent.

Patented Sept. 21, 1915.

Application filed July 30, 1910. Serial No. 574,715.

*To all whom it may concern:*

Be it known that I, RUSSELL HUFF, a citizen of the United States, and resident of Detroit, Wayne county, State of Michigan, have invented certain new and useful Improvements in Wind-Shields for Motor-Vehicles, of which the following is a specification.

This invention relates to wind shields for motor vehicles and more particularly to wind shields of that type, in which one of the members can be adjusted to different positions, and which can be folded.

The objects of this invention are to construct a wind shield which will be simple in construction, which may be easily manipulated from the driver's seat, and which will not be liable to rattle.

The invention will be described in connection with the accompanying drawings, in which—

Figure 1:
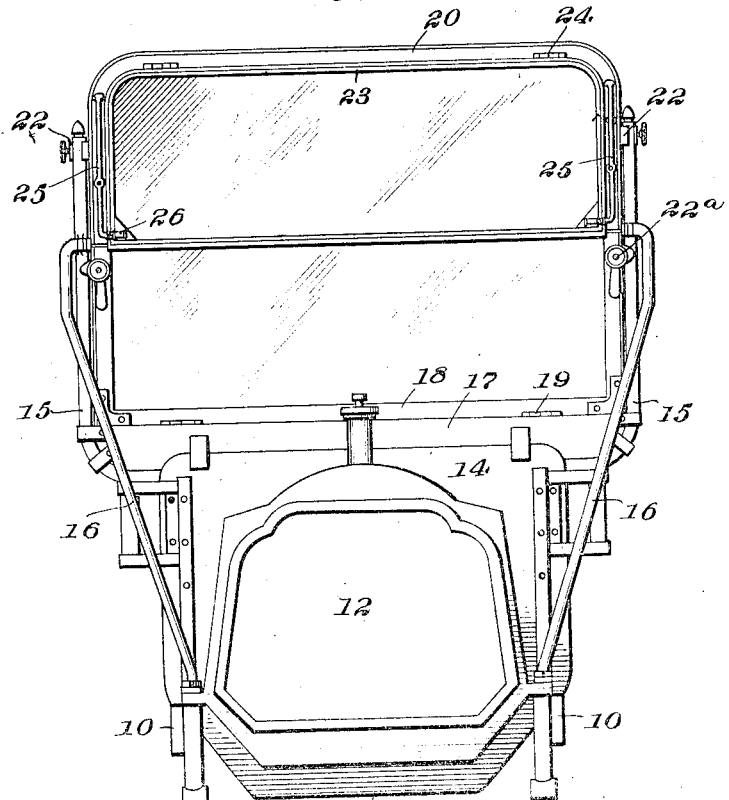
Figure 6:
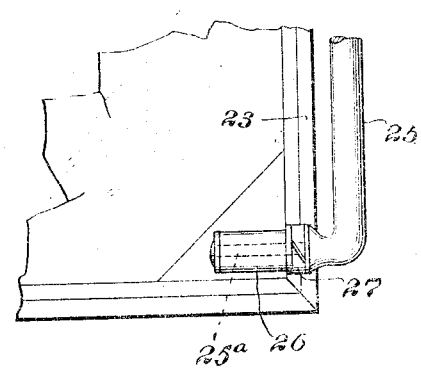
Figure 7:

Figure 1 is a front view of a part of a motor vehicle, showing the wind shield attached thereto; Fig. 2 is a view similar to Fig. 1, but on an enlarged scale; Fig. 3 is an end elevation showing the wind shield in different positions; Fig. 4 is a section on the line 4—4, Fig. 3; Fig. 5 is a section on the line 5—5, Fig. 2; Fig. 6 is a detail view of the sash; and Fig. 7 is a detail view, showing an auxiliary clamp for the bracket, the sash and bracket being shown in section.

Referring to the drawings, 10 designates the side bars of a motor vehicle, 11 the front cross bar, 12 the radiator, 13 the motor bonnet, and 14 the dash. A pair of stanchions 15 are secured to the dash and are braced by forwardly extending brace rods 16. A base member 17 of the wind shield is secured to the dash and to the stanchions as shown and the lower section 18 of the wind shield is hinged thereto at its lower edge as shown at 19. The upper section 20 of the wind shield is hinged to the lower section at 21, so that the wind shield sections are hinged to each other and to the dash. A pair of clamps 22 have a sliding engagement with the stanchions and a pivotal engagement with the upper section 20, so that the sections may be placed and clamped in different angular positions with respect to each other, and folded as shown in dotted lines in Fig. 3. In order to provide for additional security, a pair of latches 22$^a$ may be provided.

The construction so far described is substantially that shown in application by Allen Loomis, Serial No. 397,573, filed October 15, 1907.

The upper section 20 forms a frame and has mounted therein a sash 23 which is hinged or pivoted at 24, so as to swing outwardly. A bracket 25 has one end 25$^a$ thereof pivotally mounted in a bracket 26 secured to the sash 23, and the joint is completed by a friction lock washer 27, whereby the joint between the bracket and the sash is tight, so that the bracket will not swing loosely in adjusting the sash from one position to another, and so that the parts will not rattle. The bracket is provided with an angular end 28 which is provided with a tapped hole arranged to engage the threaded shank 29 of a hand screw 30, which is rotatably mounted in the sash and restrained against endwise movement by means of the knurled head and a collar 31 rigidly secured to the shank of the hand screw. The bracket 25 is provided intermediate its ends with another tapped hole 32 which is adapted to be engaged by the threaded shank 29 with the free end of the bracket resting in a socket in a stud 33 on the outer face of the upper section which forms the frame for the sash, thus clamping the bracket to the outer face of said section and thereby clamping the sash in closed position. The stud 33 is shown in detail in Fig. 7. It is to be understood that the bracket and other devices are duplicated on the other side of the sash.

The sash may be inclined forwardly and maintained in that position as shown in dotted lines in Fig. 3 by the engagement of the threaded shanks 29 with the tapped holes in the ends of the bracket 25. In order to secure the sash in closed position in its frame, the brackets 25 are moved so as to lie parallel with the outer face of the frame of the upper section with the free end against the stud 33 so that the tapped holes 32 will be engaged by the hand screws to thereby clamp the bracket and the sash. The bracket will spring slightly, thus obviating any additional locking means or set screws for the hand screws 30. When the sash is locked in closed position, the upper section can be folded against the lower section as shown in dotted lines in Fig. 3.

It will be noted that the clamps and pivots are of friction form thereby preventing rattle and liability of loose joints.

If the upper section is swung rearwardly, with the sash as shown in dotted lines in Fig. 3, until the frame of the upper section is substantially horizontal, and the parts secured in this position, it will be seen that the lower section will be inclined forwardly and the upper sash will be inclined so as to deflect the air, when the vehicle is moving forwardly, into the forward compartment.

It is obvious that various changes may be made in the details of construction, without departing from this invention, and it is therefore to be understood that this invention is not to be limited to the specific construction shown and described.

Having thus described the invention, what is claimed is:

1. In a wind shield for motor vehicles, the combination with a lower section, and an upper section adapted to fold against said lower section, of a sash pivoted to said upper section, a bracket pivoted to said sash for sustaining the sash in an inclined open position, said bracket being adapted to lie against said upper section when said sash is in closed position, means for securing said bracket in position, and supporting means pivotally connected with said sections at points on opposite sides of the pivotal connection between the sections.

2. In a wind shield for motor vehicles, the combination with a lower section, and an upper section adapted to fold against said lower section, of a sash pivoted to said upper section, a bracket pivoted to said sash for holding the sash in open and closed positions, said bracket being adapted to lie against said upper section when the sash is in closed position, means for securing said bracket in position, and supporting means pivotally connected with said sections at points on opposite sides of the pivotal connection between the sections.

3. In a wind shield for motor vehicles, the combination with a lower section, and an upper section adapted to fold against said lower section, of a sash pivoted to said upper section, a bracket pivoted to said sash for holding the sash in open position, said bracket being adapted to lie against one of said sections when the sash is closed, means for securing said bracket in different positions, and supporting means pivotally connected with said sections at points on opposite sides of the pivotal connection between the sections.

4. In a wind shield for motor vehicles, the combination with an upper folding section, of a sash pivoted within said section and adapted to open forwardly therefrom, a bracket to sustain the sash in open position, said bracket being adapted also to retain the sash in closed position and to lie against the forward face of the section when the latter is in such closed position, and means, attached to said upper section at a fixed point, adapted to be secured to said bracket at a plurality of points on the latter for the purpose of securing the sash.

5. In a wind shield for motor vehicles the combination with a swinging sash and a frame therefor, of a bracket arranged wholly in front of said frame and having a frictional joint connection with said sash, and means attached to said frame and adapted to engage and hold said bracket at a plurality of points on the latter.

6. In a wind shield for motor vehicles, the combination with a swinging sash and a frame therefor, of a bracket arranged wholly in front of said frame and having a frictional joint connection with said sash, means attached to said frame and adapted to engage and hold said bracket at a plurality of points on the latter, said means being disengaged from the bracket when the sash is swung.

7. In a wind shield for motor vehicles, the combination with a swinging sash and a frame therefor, of a bracket attached at one end to the sash and adapted when the sash is in closed position to rest at its other end against the frame, and means for drawing the central portion of the bracket toward the frame thereby securing the sash rigidly in closed position.

8. In a motor vehicle, the combination with a dash, of a pair of stanchions on the dash, a wind shield comprising pivotally connected upper and lower sections, means for slidably connecting the upper section to one of said stanchions. a swinging sash in said upper section, a bracket connected at one end to said sash, and means adjacent the point of connection of said upper section to said stanchion for supporting the other end of said bracket.

9. In a motor vehicle, the combination with a dash, of a pair of stanchions on the dash, a wind shield comprising pivotally connected upper and lower sections and the lower section being adapted to swing relatively to the dash, a clamp having a sliding connection with one of said stanchions and a pivotal connection with said upper section, a swinging sash in said upper section, and a bracket connected at one end to said sash and at the other end to said upper section.

10. In a motor vehicle, the combination with a dash, of a wind shield mounted above and pivoted to the dash, and comprising a pair of pivotally connected upper and lower sections, a supporting stanchion on the dash at each side of the wind shield rising to a point adjacent the center of the upper section, connections from the upper section to the upper end of the stanchions when the section is in normal position, a sash within the frame of the upper section and pivoted thereto and adapted to swing forwardly to open position, and a bracket to sustain the sash in open position and extending from the sash to the frame of the upper section at a point adjacent the latter's connection with the stanchion.

11. In a motor vehicle, a wind shield comprising, upper and lower sections, a sash hinged at its top in the upper section, means for preventing said sash from swinging rearwardly of the upper section, and means for holding the sash in a plurality of positions and including a fixed clamping device on said upper section, and a bracket pivoted to the sash and adapted to be engaged at its end by said clamping device to hold the sash in open position and between its ends to hold the sash in closed position.

12. In a motor vehicle, a wind shield comprising, upper and lower sections, a sash hinged at its top in the upper section, means for preventing the sash from swinging rearwardly of the upper section, and means for holding the sash in open and closed positions and including a screw fixed in the upper section and projecting from the forward side thereof, and a bracket pivoted to the front of the sash and provided with openings adapted to be engaged by said screw when the sash is in the open and closed positions.

13. In a wind shield for motor vehicles, the combination with a lower section hinged to suitable supporting means, an upper section hinged to the lower section and means for guiding said sections so that the swinging of the upper section in either direction causes a to and fro swinging movement of the lower section, of a sash pivoted at its upper edge to said upper section, and means for holding said sash in an inclined position relative to said upper section.

14. In a wind shield for motor vehicles the combination with suitable supporting means, a lower section hinged to said supporting means, an upper section hinged to said lower section, and means for guiding said sections so that the swinging of the upper section in either direction causes a to and fro swinging movement of the lower section, of a sash pivoted at its upper edge to said upper section, and means adapted to hold said sash and the lower section in substantially parallel inclined positions.

15. In a wind shield for motor vehicles, the combination with suitable supporting means of a lower section hinged to said supporting means, an upper section hinged to said lower section, and means for guiding said sections so that the swinging of the upper section in either direction causes a to and fro swinging movement of the lower section, of a sash pivoted at its upper edge to said upper section, and means for supporting said sash in open position with its lower edge elevated above the plane of said upper section.

In testimony whereof I affix my signature in presence of two witnesses.

RUSSELL HUFF.

Witnesses:
C. I. DALE,
W. H. FINCKEL, Jr.